Figure 1:
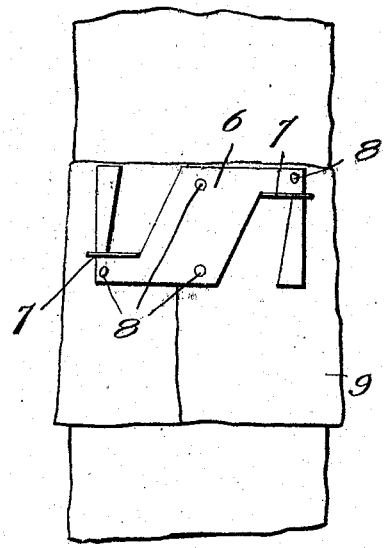

J. D. CLARK.
TREE PROTECTOR.
APPLICATION FILED SEPT. 24, 1908.

916,106.

Patented Mar. 23, 1909.

Witnesses
Fred S. Grunby.
Joseph M. Ward.

Inventor.
James D. Clark,
by Cernly & Gregory
attys.

THE NORRIS PETERS CO., WASHINGTON, D. C.

UNITED STATES PATENT OFFICE.

JAMES D. CLARK, OF WATERTOWN, MASSACHUSETTS.

TREE-PROTECTOR.

No. 916,106.     Specification of Letters Patent.     Patented March 23, 1909.

Application filed September 24, 1908. Serial No. 454,607.

*To all whom it may concern:*

Be it known that I, JAMES D. CLARK, a subject of the King of Great Britain, residing at Watertown, county of Middlesex, and State of Massachusetts, have invented an Improvement in Tree-Protectors, of which the following description, in connection with the accompanying drawing, is a specification, like numerals on the drawing representing like parts.

This invention relates to tree protectors and has for its object to provide a novel tree protector which will prevent worms, caterpillars and other vermin from crawling up the tree trunk.

My improved tree protector is especially useful in preventing gypsy moth caterpillars and brown tail moth caterpillars from crawling up the tree trunk. It is now the more or less common practice to place a band of sticky material around tree trunks to protect the trees from the gypsy moth or brown tail moth caterpillars, but where such sticky material is applied directly to the trunk of the tree it is necessary first to scrape the bark to afford a comparatively smooth surface to which the sticky material may be applied, and moreover when such a band has been applied to the trees it cannot be removed but must remain permanently on the tree.

My invention aims to provide a novel tree protector which can be readily applied to the trunk of a tree without the necessity of scraping the bark, and which when applied will effectually prevent any caterpillars from crawling up the tree trunk, and which can also be readily removed from the tree trunk when its presence on the tree trunk serves no further use.

My improved tree protector comprises a soft easily-penetrable band of fibrous material which band is provided with a coating of sticky material. The band is preferably of such a shape that when it is applied to the tree, it presents on its under side an abrupt shoulder extending radially outwardly from the tree so that in order to climb the tree it is necessary for the caterpillar to find its way over this abrupt shoulder. Since the band is provided with a coating of sticky material it is impossible for the caterpillar to crawl over it. The band can be manufactured very inexpensively and is of such a construction that it can be very readily applied to the tree and can also be easily removed from the tree.

Figure 2:
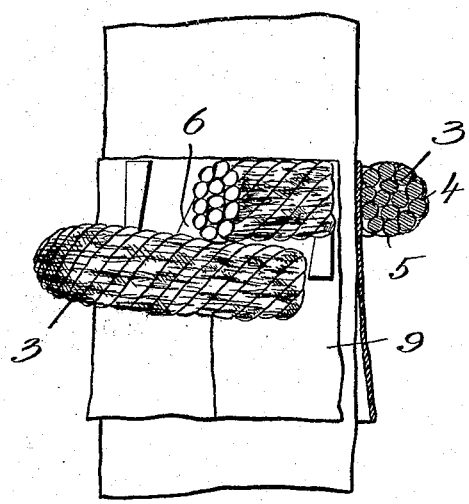
Figures 3, 4:
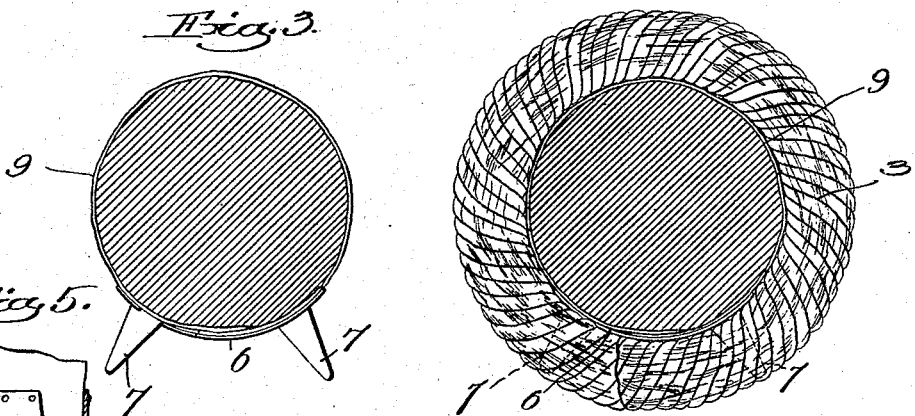
Figure 5:
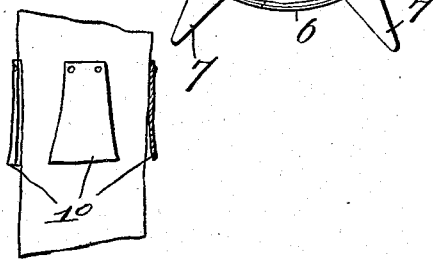

Referring to the drawings wherein I have illustrated some embodiments of my invention, Figure 1 shows a portion of a tree trunk with a band-holding device applied thereto; Fig. 2 is a similar view showing my improved tree protector in place; Fig. 3 is a top plan view of Fig. 1; Fig. 4 is a top plan view of Fig. 2; Fig. 5 shows a modification.

My improved tree protector comprises a band 3 which is preferably made of soft, easily-penetrable fibrous material, and which is provided with a coating 4 of a sticky compound. The band has such a cross sectional shape that when applied to the tree it presents at the under side 5 thereof an abrupt shoulder over which caterpillars must crawl if they are to find their way over the band. While the band might be made in various shapes I prefer to make it in rope form and to make it of some fibrous material which can be easily twisted into rope form. In making the band in this way the fibers are loosely twisted so as to present a soft, easily-penetrable band and one from which the fibers can be more or less readily pulled. I will preferably make the band about three-quarters of an inch or an inch in diameter although these dimensions are not essential. Where the band is of rope form and has this diameter it will, when applied to the tree, present the necessary abrupt shoulder 5 against which a caterpillar ascending the tree will come in contact. The size of the band is such that the caterpillar cannot span it and in order to get over the band the caterpillar would be obliged to crawl around over the exterior surface thereof. Since the band is coated with sticky material this is impossible and said band will present an effective barrier to any caterpillars attempting to crawl up the tree. Moreover since the band is made of comparatively short fibers loosely held together, whenever a caterpillar, or any other object in fact, touches the surface of the band some of the sticky coating will adhere to the caterpillar or other object, and when the caterpillar or other object retreats or is withdrawn some of the short fibers of the band are pulled out and become permanently attached to the caterpillar or other object. Any caterpillar attempting to crawl up a tree which is protected with my improved tree protector and crawl over the band will become covered with the short fibers which become pulled out from the band.

The band may be held about the tree in any suitable way. One convenient holding means is that shown in the drawing which comprises a body 6 of sheet metal having struck up therefrom two prongs 7. This body of sheet metal may be attached to the trunk of the tree by nails or tacks 8, and when in this position the prongs 7 extend radially outwardly in position to penetrate the ends of the band 3 as shown by dotted lines Fig. 4. The two prongs 7 are preferably in different horizontal planes so that the ends of the band can be made to overlap, as shown in Fig. 2.

I prefer to use in connection with my tree protector a skirt or flaps of burlap or similar fabric which is secured at the top but hangs loose at the bottom. Figs. 1 and 2 show the skirt 9 which is formed from a strip of burlap placed around the tree trunk beneath the holder 6 and which is secured in place by the tacks that retain the holder to the tree. Instead of forming a skirt which entirely encircles the tree trunk I may employ simply flaps 10 of burlap or similar fabric which are secured to the tree beneath the band. It is now the more or less common practice to place a skirt or strip of fabric around the tree in order to provide beneath said skirt or strip a sheltered spot into which the gypsy moth caterpillars may crawl after they have finished feeding. When the caterpillars have congregated beneath the skirt or strip it is comparatively easy to kill them.

Having fully described my invention, what I claim as new and desire to secure by Letters Patent is:—

In a tree protector, the combination with a band in rope form made of loosely twisted fibers and provided with a coating of sticky material, of a holder adapted to be attached to the tree trunk and having two radially-extending fingers situated in different horizontal planes and adapted to penetrate the band.

In testimony whereof, I have signed my name to this specification, in the presence of two subscribing witnesses.

JAMES D. CLARK.

Witnesses:
 LOUIS C. SMITH,
 THOMAS J. DRUMMOND.